(12) United States Patent
Posti

(10) Patent No.: US 6,434,392 B1
(45) Date of Patent: Aug. 13, 2002

(54) METHOD OF IMPLEMENTING DYNAMIC CHANNEL ALLOCATION IN A CELLULAR RADIO SYSTEM

(75) Inventor: Harri Posti, Oulu (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/355,086

(22) PCT Filed: Feb. 25, 1998

(86) PCT No.: PCT/FI98/00172
§ 371 (c)(1),
(2), (4) Date: Sep. 21, 1999

(87) PCT Pub. No.: WO98/38825
PCT Pub. Date: Sep. 3, 1998

(30) Foreign Application Priority Data

Feb. 27, 1997 (FI) .................................................. 970842

(51) Int. Cl.[7] .................................................. H04Q 7/20
(52) U.S. Cl. ...................................... 455/452; 455/450
(58) Field of Search ............................... 455/450, 436, 455/439, 443, 444, 447, 452, 464, 509, 525, 562, 62, 67.1, 67.6, 513, 522, 423, 67.3; 370/330, 337

(56) References Cited

U.S. PATENT DOCUMENTS

| | | | | |
|---|---|---|---|---|
| 4,696,027 A | * | 9/1987 | Bonta | 455/436 |
| 5,276,730 A | * | 1/1994 | Cimini | 455/450 |
| 5,448,750 A | * | 9/1995 | Eriksson et al. | 455/452 |
| 5,491,837 A | | 2/1996 | Haartsen | |
| 5,517,673 A | * | 5/1996 | Fehnel | 455/434 |
| 5,519,884 A | * | 5/1996 | Duque-Anton et al. | 455/450 |
| 5,708,968 A | * | 1/1998 | Suzuki | 455/62 |
| 5,715,516 A | * | 2/1998 | Howard et al. | 455/422 |
| 5,809,422 A | * | 9/1998 | Raleigh et al. | 455/449 |
| 5,809,423 A | * | 9/1998 | Benveniste | 455/452 |
| 5,844,894 A | * | 12/1998 | Dent | 370/330 |
| 5,862,487 A | * | 1/1999 | Fujii et al. | 455/454 |
| 5,903,554 A | * | 5/1999 | Saints | 370/342 |
| 5,953,661 A | * | 9/1999 | Schwinghammer et al. | 455/423 |
| 5,991,630 A | * | 11/1999 | Charas | 455/452 |
| 6,078,812 A | * | 6/2000 | Mintz | 455/434 |
| 6,078,823 A | * | 6/2000 | Chavez et al. | 455/562 |
| 6,101,176 A | * | 8/2000 | Honkasalo et al. | 370/335 |
| 6,141,335 A | * | 10/2000 | Kuwahara et al. | 370/342 |
| 6,292,661 B1 | * | 9/2001 | Patronen et al. | 455/436 |

FOREIGN PATENT DOCUMENTS

| | | |
|---|---|---|
| EP | 639 929 | 2/1995 |
| EP | 648 028 | 4/1995 |
| EP | 702 462 | 3/1996 |
| EP | 716 555 | 6/1996 |
| WO | 96/04722 | 2/1996 |
| WO | 96/29837 | 9/1996 |

\* cited by examiner

*Primary Examiner*—Nay Maung
*Assistant Examiner*—Jean A Gelin
(74) *Attorney, Agent, or Firm*—Pillsbury Winthrop LLP

(57) ABSTRACT

A method of implementing dynamic channel allocation in a cellular radio system. The cellular radio system includes, in each cell, at least one base station communicating with subscriber terminals within its area. The system includes, in one cell, at least two subeeils, which include an anrenna unit and in which all available frequencies are dynamically used. All antenna units listen to control channels that subscriber terminals use for connection set-up and a base station measures the power level of the control channels through the antenna units, on the basis of which an antenna unit providing the strongest sigxzal is selected for conricction set-up. The base station measures through the antenna units the interference level of all available traffic channels, on the basis of which that traffic channel in an antenna unit selected for connection set-up which has the least interference is selected for communication. The base station measures through the antenna units the power level of the signals of subscriber terminals having a uaffic connection.

8 Claims, 2 Drawing Sheets

| 0 BCCH | 1 TCH | 2 TCH | 3 TCH | 4 TCH | 5 TCH | 6 TCH | 7 TCH |

METHOD OF IMPLEMENTING DYNAMIC CHANNEL ALLOCATION IN A CELLULAR RADIO SYSTEM

This application is the national phase of international application PCT/FI198/00172 filed Feb. 25, 1998 which designated the U.S.

BACKGROUND OF THE INVENTION

1. Field of the Invention

The invention relates to a method of implementing dynamic channel allocation in a cellular radio system, the system comprising: in each cell, at least one base station which communicates with subscriber terminals located within its area, which broadcasts at least at one carrier frequency and which transmits information about itself on control channels to subscriber terminals; in at least one cell, at least two subcells which comprise an antenna unit and in which all available frequencies are dynamically used; and a base station of the system measuring, through each antenna unit, a level of interference of all available traffic channels, on the basis of which that traffic channel in an antenna unit selected for connection set-up which has the least interference is selected for communication.

2. Description of the Related Art

In cellular radio systems, a user's speech and data between a base station and a subscriber terminal are transmitted on a traffic channel. Between a base station and a subscriber terminal are also needed various control messages and system information, which are transmitted on control channels. An example of a control channel that can be mentioned is a BCCH channel, which is used in the GSM system for transmitting connection set-up information from a base station to subscriber terminals.

In the current GSM system, a carrier frequency that comprises a BCCH channel, i.e. a BCCH carrier frequency, is transmitted uninterruptedly at a constant power level. A subscriber terminal continuously measures the power level of the BCCH carrier frequencies transmitted by adjacent base stations and reports the measurement results to the base station serving the subscriber terminal. On the basis of the measurement results, the system decides an appropriate moment for a handover to another base station.

The requirement that in the current GSM system a BCCH carrier frequency is to be transmitted uninterruptedly at a constant power level prevents the use of certain methods developed to improve connection quality and system capacity on control and traffic channels of a BCCH carrier frequency. The methods developed to improve connection quality and system capacity in cellular radio systems include for instance frequency hopping, discontinuous transmission and adjustment of transmission power.

Effective utilization of a frequency spectrum is one of the main objectives in cellular radio systems. Most channel allocation methods are based on the reuse of frequencies beyond a given interference distance. The conventional GSM system is implemented by using Fixed Channel Allocation (FCA). In this method the frequencies available for use in the system are divided into groups and fixedly allocated to different cells. The frequency groups can be reused in cells which are at a sufficient distance from each other. The reuse distance is determined by the level of co-channel interference that the system tolerates.

If the traffic load estimate concerning each cell is correct and the traffic loads do not vary greatly, fixed channel allocation functions reasonably well in macrocells, i.e. in cells the size of which is between one kilometer and several dozens of kilometers. A disadvantage in fixed channel allocation is that precise and laborious frequency planning is required to allow co-channel interference to be minimised. In addition, fixed channel allocation adjusts poorly to variations in traffic loads.

The above disadvantages in fixed channel allocation are emphasised in cellular radio systems with a small cell size, such as office systems, where variations in radio traffic load are usually larger than in macrocell systems, which complicates radio network planning. The load of radio traffic grows strongly in environments using small cells, and the network should be able to easily adapt to the increase in traffic. The adding of new cells to a network applying fixed channel allocation requires, however, that frequency planning as a whole is renewed.

SUMMARY OF THE INVENTION

To obtain a solution to the above-mentioned problems, a more flexible and more adjustable channel allocation method than the one provided by fixed channel allocation is required. In the purest form of Dynamic Channel Allocation (DCA), all frequencies of the system are available in every cell. No frequency group is allocated to a particular base station; instead, all channels can be taken in use at any base station. Channel selection can be made at the moment of call set-up on the basis of the interference situation at the time concerned. The major advantages of dynamic channel allocation are its flexibility in connection with different traffic loads and its greater efficiency in the utilization of the frequency spectrum. In addition, frequency planning is no longer needed. As cell size diminishes, the advantages of and the need for dynamic channel allocation become further emphasised.

An intermediate form of fixed and dynamic channel allocation is a channel allocation method in which some of the channels are fixedly allocated and others are dynamically available. Also in such a method the advantages offered by dynamic channel allocation can be utilized.

An object of the present invention is thus to provide dynamic channel allocation in a cellular radio system.

This is achieved with a method described in the preamble, characterized in that all antenna units listen to control channels used by subscriber terminals for call set-up, and a base station measures the power level of the control channels through antenna units, on the basis of which an antenna unit providing the strongest signal is selected for connection set-up; and characterized in that common control channels are transmitted through all antenna units; and characterized in that traffic channels are transmitted through an antenna unit in which a signal received from a subscriber terminal is the strongest; and characterized in that a traffic channel is reused in another subcell.

The method of the invention provides distinct advantages compared with the prior art. The invention enables dynamic channel allocation to be performed in a cellular radio system. This improves the flexibility of the system in connection with different traffic loads and enhances the utilization of the frequency spectrum. Also the need for frequency planning is substantially reduced. The method of the invention thus enables a reuse of traffic channels in different subcells within a cell. The advantages of dynamic channel allocation are particularly emphasised in networks with small cell sizes.

BRIEF DESCRIPTION OF THE DRAWINGS

In the following the invention will be described in greater detail with reference to examples in the attached drawings, in which.

DETAILED DESCRIPTION OF THE EMBODIMENTS

Figures 1, 2:
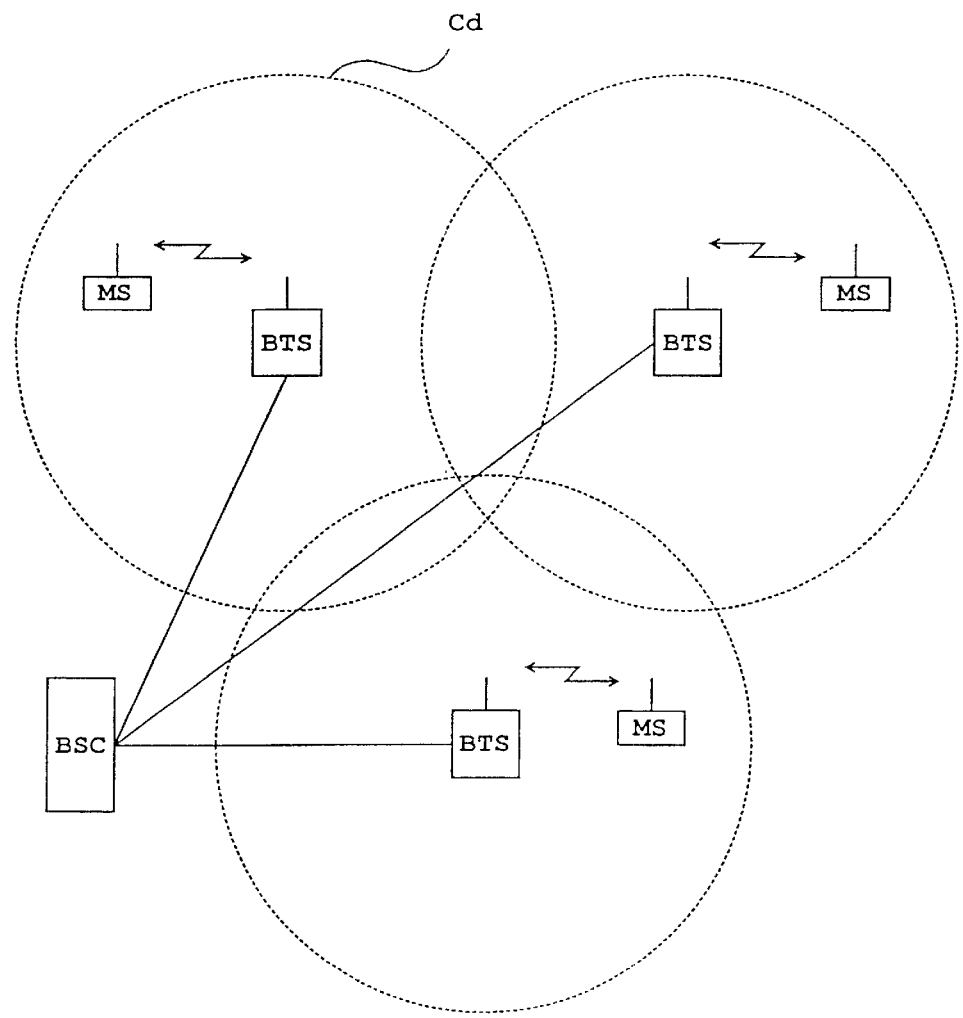
FIG. 1 illustrates a cellular radio system, to which a method of the invention can be applied.
FIG. 2 illustrates a structure of a time-division frame in the current GSM system.

FIG. 1 illustrates a cellular radio system, to which a method of the invention can be applied. A cell Cd represents a cell applying dynamic channel allocation. In a cellular radio system, each cell has at least one base station BTS, which communicates with subscriber terminals MS located within its area. A base station controller BSC, in turn, controls the operation of one or more base stations BTS. In cellular radio systems, a user's speech and data traffic between a base station and a subscriber terminal is transmitted on traffic channels. Between a base station and a subscriber terminal are also needed various control messages and system information, which are transmitted on control channels. The method of the invention can be applied to any cellular radio system utilizing an FDMA multiple access system or a time-division multiple access system TDMA. Although in the following description the method of the invention is applied to the GSM system, it is not restricted to the system.

FIG. 2 illustrates a structure of a BCCH carrier frequency frame of the current GSM system. A BCCH carrier frequency frame comprises eight time slots which are numbered from 0 to 7. Control channels are typically sent in the first time slot of the frame, the time slot being indicated by the number 0. Control channels can, however, be also sent in other time slots. Examples of control channels include a BCCH channel, which is used in the GSM system for transmitting connection set-up information from a base station to subscriber terminals, and an SDCCH channel, which is used for transmitting connection set-up information between a base station and a subscriber terminal before a traffic channel is allocated. In the example in FIG. 2, time slots from 1 to 7 of a BCCH carrier frequency are used for transmitting traffic channels TCH.

Figure 3:
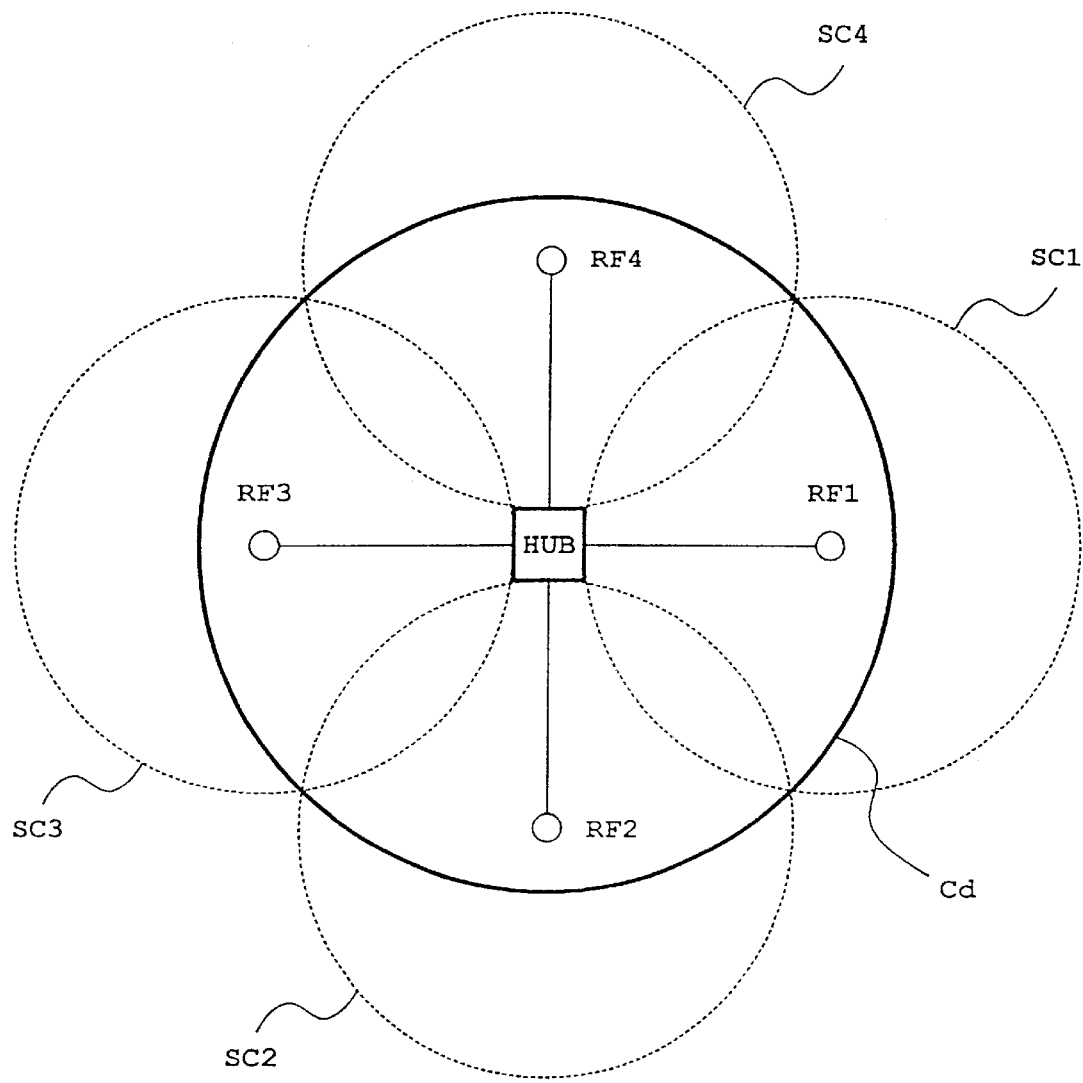
FIG. 3 illustrates a structure of a cell applying a method of the invention.

FIG. 3 illustrates a structure of a cell Cd applying the method of the invention. The cell Cd comprises a base station hub HUB, and the cell Cd is divided into subcells SC1–SC4 comprising antenna units RF1–RF4. An example of a practical implementation could be an office building that forms, as a whole, a single cell, the floors of the building each forming one subcell. A BCCH carrier frequency is transmitted through all antenna units so as to make call set-up and handover possible. At other carrier frequencies, traffic channels are dynamically allocated to different subcells and to the frequencies available, and on the traffic channels can also be used frequency hopping.

For antenna unit selection, all antenna units listen to control channels RACH and SDCCH used by a subscriber terminal for call set-up and a base station measures the power level of the control channels through the antenna units. On the basis of the measurements, the antenna unit providing the strongest signal is selected for connection set-up. Signalling relating to call set-up can take place either on an SDCCH channel, which is transmitted through all antenna units, or on a traffic channel, which is only transmitted through one antenna unit at a time. The identification of an antenna unit at a base station can be performed in various alternative ways. One alternative is to convey the signals of each antenna unit to different base frequency parts at the base station hub, the base frequency parts then identifying the antenna unit concerned. Another way is to add a delay of a different length between each antenna unit and the base station hub. In a third alternative, each antenna unit sends an individual identifier on a particular control channel.

A traffic channel is selected by a base station measuring through the antenna units the level of interference of all available traffic channels. On the basis of the measurements, that traffic channel of the antenna unit selected for connection set-up which has the least interference is selected for communication.

An intra-subcell handover is performed in the system if the quality of a connection on a traffic channel measured by a base station degrades but the serving antenna unit still provides the strongest signal. On the basis of the measurements, a traffic channel with the least interference is selected for the handover.

An inter-subcell handover is performed in the system if the power level of a subscriber terminal signal measured by a base station degrades. All antenna units measure the power level of the signals of all subscriber terminals having a traffic connection. Alternatively, only the antenna units closest to each subscriber terminal measure the power level of a signal of the subscriber terminal in question. On the basis of the measurements, an antenna unit providing the strongest subscriber terminal signal is selected, and transmission is first started through a new antenna unit, after which transmission through an old antenna unit is completed. If the connection from one antenna unit to another can be performed sufficiently quickly, it is possible, alternatively, to first complete transmission through the old antenna unit and then start transmission through the new antenna unit.

A handover from an external cell to a cell applying the method of the invention is carried out by performing first a handover to a traffic channel of a BCCH carrier frequency, said traffic channel being sent through all antenna units. The most suitable antenna unit and traffic channel are then selected and the transmission continues only through the selected antenna unit. A handover from a cell applying the method of the invention to an external cell is performed in a manner conventional in the GSM system.

In the method of the invention, location is a significant factor, in addition to frequency and time slot, determining the use of a channel. In conventional networks location acts as a determining factor through the cells, whereas in networks applying the method of the invention, location can be dimensioned inside cells by means of subcells.

Although the invention is described above with reference to an example according to the attached drawings, it is apparent that the invention is not restricted to the example, but it can be modified in many ways within the inventive idea disclosed in the attached claims.

What is claimed is:

1. A method for implementing dynamic channel allocation in a cellular radio system, the method comprising:

dynamically allocating all available transmission frequencies in at least two subcells of at least one cell, each subcell comprising an antenna unit associated with the subcell of the at least one cell;

communicating, via a base station and the antenna units associated with the at least one cell, with subscriber terminals located within an area corresponding to the at least one cell;

transmitting, via the base station and the antenna units of the at least one cell, at least at one carrier frequency and broadcasting information about the base station on control channels to subscriber terminals;

transmitting common control channels through the antenna units associated with the at least one cell;

measuring, via the base station and the antenna units associated with the at least one cell, levels of interference of all available traffic channels;

selecting a traffic channel of an antenna unit, included in the antenna units associated with the at least one cell, for connection set up, the selected traffic channel having the least interference based on the antenna units' measurements of interference level;

listening, via the antenna units of the at least one cell, to control channels used by the subscriber terminals for call set up;

measuring, via the base station and the antenna units of the at least one cell, power levels of the control channels;

selecting a serving antenna unit, included in the antenna units associated with the at least one cell, for connection set up, the selected antenna unit providing a strongest signal based on the antenna units' measurements of power level; and transmitting a traffic channel via the selected serving antenna unit.

2. The method of claim 1, further comprising performing an intra-subcell handover if a connection quality on a traffic channel measured by the base station degrades but the serving antenna unit still provides the strongest signal, the handover being performed by selecting, based on the interference level measurements, a traffic channel with the least interference.

3. The method of claim 1, further comprising performing an inter-subcell handover between the serving antenna unit and a new serving antenna unit if a signal power level measured by the base station degrades, the handover being performed by selecting, based on the power level measurements, an antenna unit providing the strongest signal and by first starting a transmission through the new serving antenna unit and then completing transmission through the present serving antenna unit.

4. The method of claim 3, wherein the base station measures power levels of subscriber terminal signals having a traffic connection through the antenna units.

5. The method of claim 1, further comprising performing an inter-subcell handover between the serving antenna unit and a new serving antenna unit if a signal power level measured by the base station degrades, the handover being performed by selecting, based on the power level measurements, an antenna unit providing the strongest signal and by first completing transmission through the present serving antenna unit and then starting transmission through the new serving antenna unit.

6. The method of claim 1, wherein, at each frequency, a signal to be transmitted is divided on a time-division basis into frames comprising a plural number of time slots and wherein a BCCH carrier frequency is transmitted through all antenna units associated with the at least one cell.

7. The method of claim 1, wherein dedicated control channels are transmitted either through all antenna units or only through the antenna unit in which a signal received from the subscriber terminals is the strongest.

8. A method for implementing dynamic channel allocation in a cellular radio system, the method comprising:

dynamically allocating all available transmission frequencies in at least two subcells of at least one cell, each subcell comprising an antenna unit associated with the subcell of the at least one cell;

communicating, via a base station and the antenna units associated with the at least one cell, with subscriber terminals located within an area corresponding to the at least one cell;

transmitting, via the base station and the antenna units associated with the at least one cell, at least at one carrier frequency and broadcasting information about the base station on control channels to subscriber terminals;

transmitting common control channels through the antenna units associated with the at least one cell;

listening, via the antenna units of the at least one cell, to control channels used by the subscriber terminals for call set up;

measuring, via the base station and the antenna units of the at least one cell, power levels of the control channels;

selecting a serving antenna unit, included in the antenna units associated with the at least one cell, for connection set up, the selected antenna unit providing a strongest signal based on the antenna units' measurements of power level; and transmitting a traffic channel via the selected serving antenna unit.

* * * * *